Sept. 14, 1954 J. H. EMERSON 2,688,959
INCUBATOR FOR INFANTS
Filed March 29, 1952 2 Sheets-Sheet 1

Inventor
John H. Emerson
by Roberts, Cushman & Grover
Att'ys.

Sept. 14, 1954     J. H. EMERSON     2,688,959
INCUBATOR FOR INFANTS

Filed March 29, 1952     2 Sheets-Sheet 2

Inventor
John H. Emerson
by Roberts, Cushman & Grover
Att'ys.

Patented Sept. 14, 1954

2,688,959

UNITED STATES PATENT OFFICE 2,688,959

INCUBATOR FOR INFANTS

John H. Emerson, Arlington, Mass.

Application March 29, 1952, Serial No. 279,383

7 Claims. (Cl. 128—1)

This invention relates to incubators for infants. One example of the type of infants placed in such an incubator is a baby which has been prematurely born.

Incubators of the type to which this invention pertains consist of a baby enclosing casing within which there is provided a support upon which the baby reclines.

More particularly the invention relates to an improved casing, patient support and heating arrangement whereby the interior of the casing may be maintained at a very high relative humidity, for example one hundred percent or greater, at a uniform temperature, moisture which condenses on the inner surface of the casing flows to the bottom of the casing without wetting the patient, or the patient support, and a casing is provided which may be quickly and thoroughly cleaned.

The principal object of this invention is to provide an incubator casing which is so constructed that neither the patient nor the patient support are wet by water which condenses on the inner surface of the casing.

A further object is to provide such an incubator casing which has substantially unobstructed interior walls so that they may be quickly and thoroughly cleaned.

Another object is to provide such an improved casing which is heated and humidified by a body of water located in the bottom of the casing and a heating element and a heat sensitive control therefor located adjacent to the exterior surface of the bottom wall of the casing.

A further object is to provide a novel incubator for infants which is simple in operation and economical to manufacture.

Other objects relate to the construction and mode of operation and will be apparent from the following description and the accompanying drawings which exemplify one embodiment of my invention chosen for the purposes of illustration.

Figure 1:
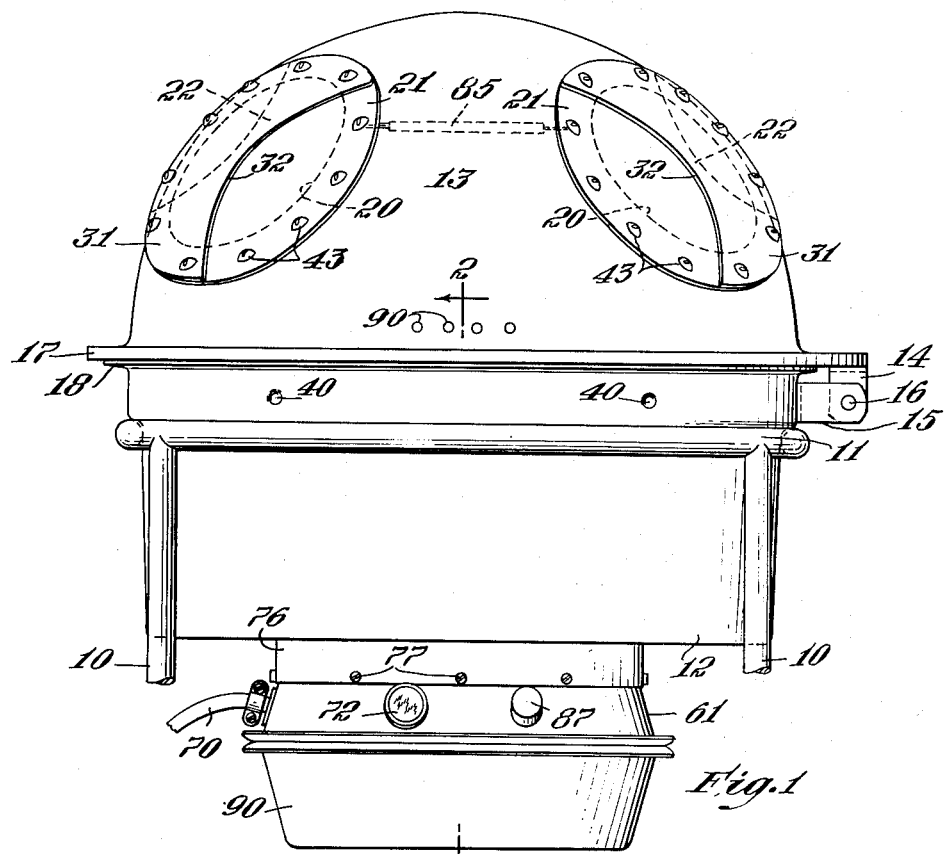
Fig. 1 is an end elevation of an apparatus embodying my invention.

In the apparatus illustrated the supporting structure comprises four legs 10 secured to a substantially rectangular frame member 11. Casters (not shown) are mounted on the lower extremities of the legs 10 so that the incubator may be readily moved from place to place.

The incubator casing comprises a pan-like lower casing member 12 which may be made of stainless steel and the transparent upper casing member 13 which is outwardly curved or convex in cross section. The upper member 13 may be made of a transparent plastic such as Lucite and it is provided with a flange 17 which rests lightly upon the flange 18 of the lower member 12. The upper member 13 is hinged to the lower member 12 by means of a pair of spaced lugs 14 secured to the upper member 13, a pair of spaced lugs 15 secured to the lower member 12 and a horizontal rod 16 which is secured to the lugs 15 and passes loosely through perforations in the lugs 14. Thus the upper member 13 may be moved upwardly about the horizontal axis formed by the rod 16 to open the casing to permit the baby to be placed therein and then lowered to close the casing.

Perforations 90 in the upper casing member 13 provide vents through which air is admitted to the casing.

In the apparatus which is illustrated four substantially circular openings 20 are provided in the upper casing member 13. Each of these openings is of sufficient size to receive the hand and forearm of an attendant when the attendant's hand is inserted from the exterior to the interior of the casing. The closure for each opening 20 includes a first strip of resilient material 21 made of vulcanized rubber, neoprene or the like, which is attached to one side of the periphery of the opening 20 and which bridges slightly more than one-half of the opening and a second strip of resilient material 31 attached to the casing adjacent to the other side of the periphery of the opening and bridging the portion of the opening which is not bridged by the first strip. The second strip 31 overlaps the first strip 21 adjacent to the edge of the first strip which extends across the opening. The first strip 21 is provided with a concave edge 22 and the second strip 31 is provided with a concave edge 32.

The closure strips 21—31 are detachably held in position by a plurality of enlarged headed studs 43 located adjacent to the periphery of the opening 20, said studs passing through a plurality of perforations in the portions of the strips which overlie the casing. The faces of the heads of the studs 43 which are adjacent to the casing member 13 are spaced outwardly from the casing a sufficient distance to permit the strips to lie loosely between said faces and the casing member 13. This type of closure for an armhole is the subject matter of another application for patent and the present invention is not in any way dependent upon the provision of armholes nor of closures therefor.

The patient support comprises a stainless steel pan 35 and a sponge rubber pad or mattress 36. Instead of the sponge rubber pad a sheet of seran or woven plastic may be stretched across the top of the pan 35 to receive the baby or its bed clothing.

The pan 35 is supported by four hemispherical members 40 which may be formed from the material of the side walls of the lower casing member 12 by deforming them with a tool having a hemispherical end surface. The outer edge of the downwardly sloped flange 38 of the pan 35 is spaced from the adjacent portions of the side walls 41 and 42 except where the edge of the flange contacts the four hemispherical members 40. Thus, a space is provided between the patient support 35 and the side walls of the lower casing member 12 throughout substantially their entire lengths to permit moisture which condenses on the curved interior surface of the upper casing member 13 to flow downwardly and outwardly of the upper casing member 13, to the side walls 41 and 42 of the lower casing member 13 and thence to the body of water 45 in the bottom of the casing, all without passing into the patient support 35 or contacting the patient.

Any water which flows to the members 40 is not transferred to the baby support 35 because of the hemispherical shape of the members 40 and the downwardly curved flange 38 of the patient support.

Instead of hemispherical projections 40 other suitable projections may be used, for example, studs which are circular in cross section may each have one end spot welded to a side wall 41 and the other end extending downwardly and inwardly at an angle of about sixty degrees to the side wall.

The atomizer 50 is used for admitting oxygen which is supplied through a conduit 51 from any suitable source of oxygen under pressure. The lower end of the tube 52 is located beneath the surface of the body of water 45 and the flow of oxygen through the atomizer 50 draws water upwardly through the tube 52 and the water is atomized by the atomizer 50 and distributed to the interior of the casing in the form of tiny droplets. The apparatus functions satisfactorily without this atomizer in which event oxygen is conducted directly to the interior of the casing by the tube 51 and the atomizer is omitted.

When the atomizer 50 is not used an inverted pan 46 may be placed on the bottom of the casing to control the surface of the body of water which is exposed and to correspondingly control the humidity of the atmosphere within the casing. One hundred percent humidity may thus be obtained without the use of an atomizer.

An electrical heating element 60 is supported adjacent to the bottom of the inverted aluminum pan member 61 by the metal strip 62 which engages the lower edges of the members 63. The upper edges of the members 63 engage the coils of the heating element. Nuts 65 are threaded to bolts 66 which are spot welded to the bottom of the pan 61 and these nuts hold the plate 62 in position to support the heating element.

Four bolts 55 have their upper ends spot welded to the bottom of the lower casing member 12 and the lock nuts 68 hold the bottom of the pan 61 closely adjacent to the bottom of the lower casing member 12. A layer of heat conducting paste is preferably provided between the bottoms of the pan 61 and casing member 12 to prevent the formation of air spaces between said surfaces and to insure the proper transmission of heat from the bottom of the pan 61 to the bottom of the lower casing member 12.

Electric current for energizing the heating element is supplied from any suitable source of current through the cord 70 (Fig. 1). The signal light 72 is connected in series in the heating circuit and it indicates that the heating element is in operation.

Figure 2:
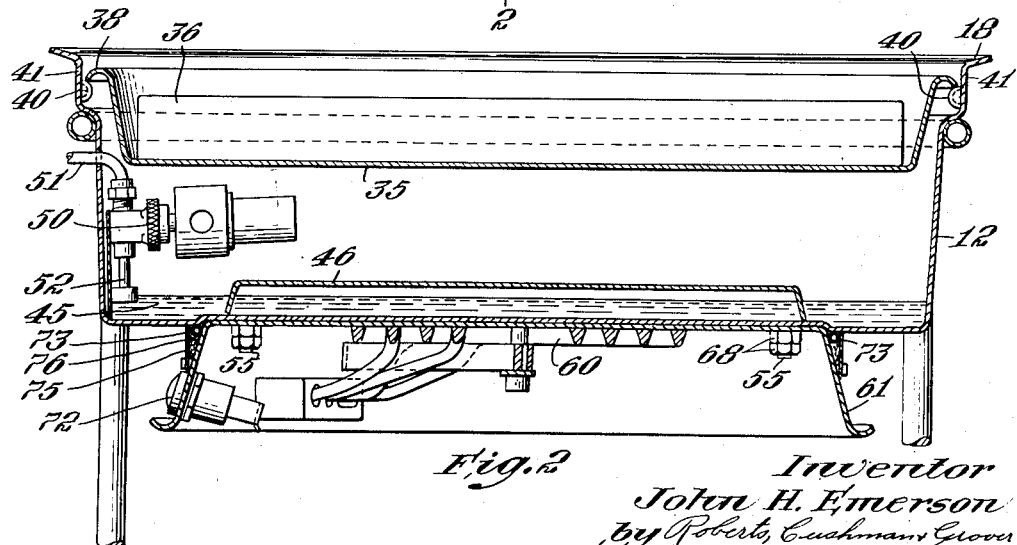
Fig. 2 is a section on the lines 2—2 of Fig. 1 with the upper casing member and the lower closure member for the heating element removed.
Figure 3:
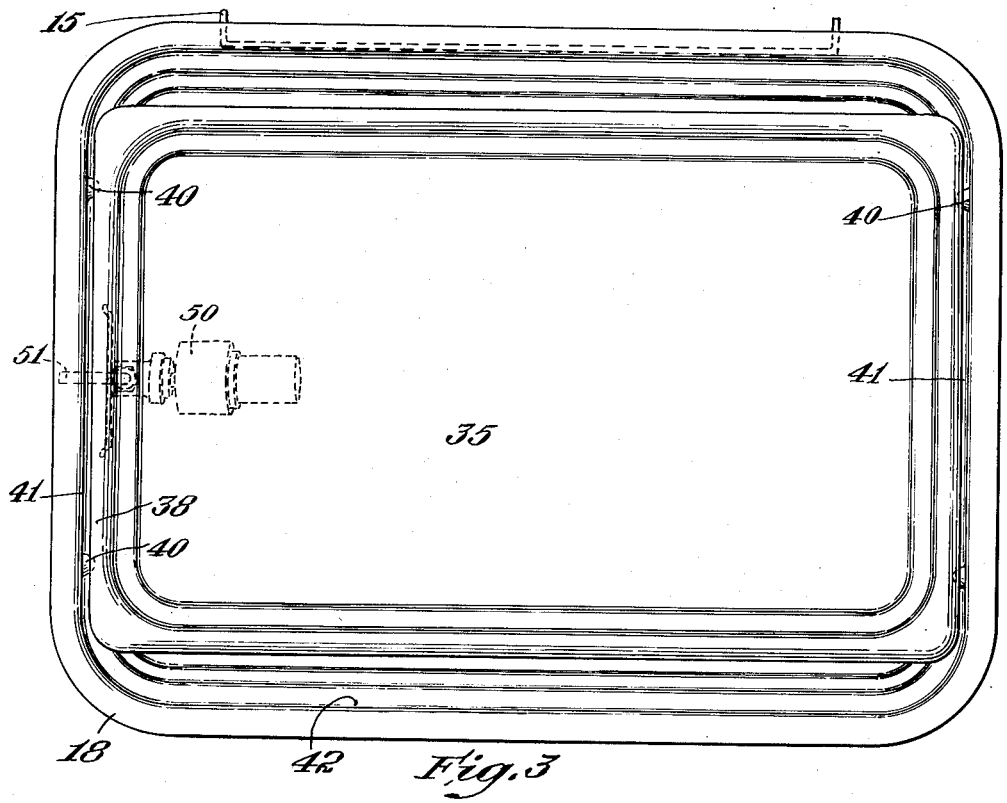
Fig. 3 is a top plan view of the lower casing member and the patient support.
Figure 4:
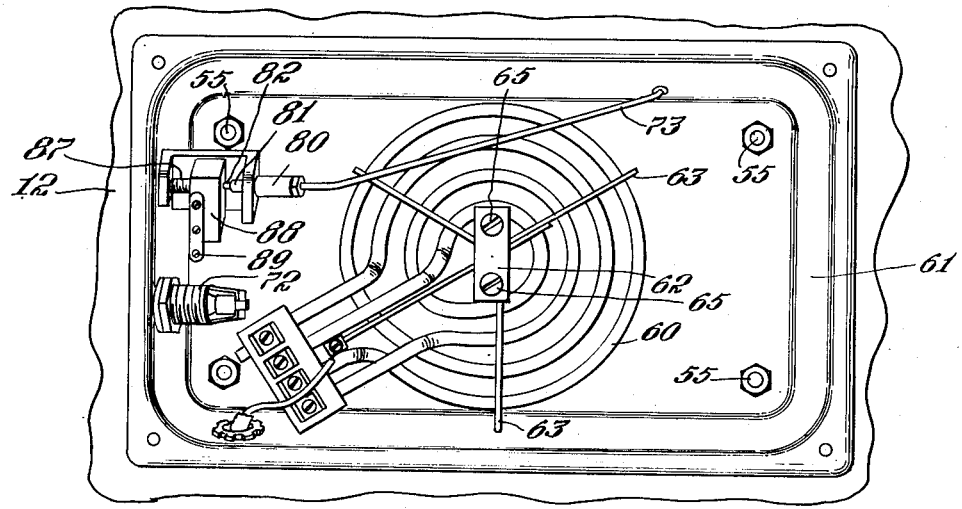
Fig. 4 is a plan view of the lower casing member and heating element in inverted position.

The heating element is thermostatically controlled by a sensing element which comprises a copper tube 73 (Figs. 2 and 4) filled with a readily expanding liquid such as alcohol. The tube 73 is mounted in contact with the bottom of the lower casing member 12 by means of the metallic strip 76, screws 77 and asbestos 75.

One end of the tube 73 is closed and the other end communicates with the interior of a bellows or Sylphon (not shown) located within the cylindrical housing 80. The plunger 81 is moveable by the Sylphon and it operates the spring pressed switch element 82 to open the heater circuit when the desired temperature of the interior of the casing is exceeded and to close the heater circuit when the temperature of the interior of the casing falls below the desired temperature. The temperature of the interior of the casing is recorded by the thermometer 85 which may be observed through the transparent upper casing member 13.

The inner end of the adjustment screw 87 engages the face of the switch housing 88 which is mounted for pivotal movement about the pivot 89. By manually rotating the adjustment screw 87 the distance between the outer end of the switch element 82 and exposed end of the plunger 81 may be varied so as to control the temperature which will be maintained within the incubator casing.

The lower pan member 90 may be made of aluminum and it is detachably secured to the pan 61 by screws (not shown) which pass through interiorly threaded perforations in the outwardly extending flanges of said pans. This merely provides an enclosure for the heating element.

In use the heating element is energized by plugging the cord 70 into a suitable source of electric current. The heating element warms the body of water 45 which heats the interior of the casing and also humidifies the atmosphere therein. When the interior of the casing has been heated to the desired temperature which may be from 80° F. to 95° F., the baby is placed within the casing upon the patient support 35, 36 by elevating the upper casing member 13. The valve (not shown) at the source of oxygen is then opened to initiate feeding of oxygen to the interior of the casing. The temperature of the interior of the casing may be observed by the thermometer 85 and if any change is desired it may be made by manipulating the adjustment screw 87.

When the nurse desires to place her hand within the casing to care for the baby she passes it between the concave edges 22 and 32 of the resilient strips 21—31 and the concave edges of the strips engage her wrist or forearm thereby maintaining a substantially air-tight seal between it and the casing and preventing the loss of heated air, oxygen or the like. When she withdraws her hand the strips automatically return to their normal position in which they bridge the opening and their adjacent edges are overlapped.

When it is desired to clean the interior of the casing, the upper casing member 13 is opened by rotating it about the hinge (14, 15, 16), the patient support 35 is removed and the substantially smooth, unobstructed interior walls of the upper and lower casing members 12 and 13 are scrubbed and disinfected.

While I have shown and described one desirable embodiment of the invention, it is to be understood that this disclosure is for the purpose of illustration only and that various changes in shape, proportion and arrangement of parts and the substitution of equivalent elements may be made without departing from the spirit and scope of the invention as set forth in the appended claims.

I claim:

1. An incubator for infants comprising a lower casing member having substantially smooth, unobstructed side walls, the bottom of said lower casing comprising a fluid reservoir for holding an open body of water, a patient support mounted within the lower casing member with its sides spaced from the side walls of the lower casing member throughout substantially their entire lengths to permit liquid to flow downwardly in such space without passing to the patient support and an upper casing member mounted above said lower casing member and with it forming an enclosing casing for the patient support, said upper casing member being outwardly convex in cross section whereby moisture which condenses on the walls of the upper casing member flows downwardly and outwardly to the side walls of the lower casing member, between the sides of the patient support and thence to the said water reservoir in bottom of said lower casing member means for vaporizing said open body of water to maintain the atmosphere within said enclosing casing at any desired humidity as high as 100% humidity, said enclosing casing being free of vents of sufficient size to prevent the maintenance of said humidity.

2. An incubator for infants comprising a lower casing member having substantially smooth, unobstructed side walls, the bottom of said lower casing comprising a fluid reservoir for holding an open body of water, a patient support mounted within the lower casing member with its sides spaced from the side walls of the lower casing member throughout substantially their entire lengths to permit liquid to flow downwardly in such space without passing to the patient support, an upper casing member mounted above said lower casing member and with it forming an enclosing casing for the patient support, means for maintaining the atmosphere within said enclosing casing at any desired humidity as high as 100% humidity, including heating means adjacent to the exterior surface of the bottom wall of the lower casing member, said upper casing member being outwardly convex in cross section whereby moisture which condenses on the walls of the upper casing member flows downwardly and outwardly to the side walls of the lower casing member, between the sides of the patient support and thence to said water reservoir in the bottom of said lower casing member.

3. An incubator for infants comprising a lower casing member having substantially smooth, unobstructed side walls the bottom of said lower casing comprising a fluid reservoir for holding an open body of water, a patient support mounted within the lower casing member with its sides spaced from the side walls of the lower casing member throughout substantially their entire lengths to permit liquid to flow downwardly in such space without passing to the patient support, heating means adjacent to the exterior surface of the bottom wall of the lower casing member, a heat sensitive element adjacent to the exterior surface of the bottom wall of the lower casing member, a switch operable by said heat sensitive element for controlling the current transmitted to said heating means, and an upper casing member mounted above said lower casing member and with it forming an enclosing casing for the patient support, said upper casing member being outwardly convex in cross section whereby moisture which condenses on the walls of the upper casing member flows downwardly and outwardly to the side walls of the lower casing member between the sides of the patient support and thence to said water reservoir in the bottom of said lower casing member.

4. An incubator for infants comprising a lower casing member having substantially smooth side walls the bottom of said lower casing comprising a fluid reservoir for holding an open body of water, a plurality of spaced members projecting inwardly and downwardly from the lower casing side walls, and a patient support having at least two opposite side portions resting upon and supported by said projecting members, the sides of said patient support being spaced from the side walls of the lower casing member, whereby liquid may flow downwardly between the side walls of the casing member and the sides of the patient support without passing to the patient support, said patient support being in the form of a solid pan whereby fluids are prevented from dripping from said patient support into said open body of water.

5. An incubator for infants comprising a lower casing member having substantially smooth side walls, a plurality of spaced members projecting inwardly and downwardly from the lower casing side walls, and a patient support having downwardly extending flanges on at least two opposite sides, said flanges resting upon said projecting members and being spaced from the adjacent side walls of the lower casing member, whereby liquid may flow downwardly between the flanges and the side walls without passing to the patient support.

6. An incubator for infants comprising a lower casing member having substantially smooth side walls, a plurality of spaced hemispherical members projecting inwardly from the lower casing side walls, and a patient support having at least two opposite side portions resting upon and supported by said hemispherical members, the sides of said patient support being spaced from the side walls of the lower casing member except for said contact with said hemispherical members, whereby liquid may flow downwardly between the side walls of the casing member and the sides of the patient support without passing to the patient support.

7. An incubator for infants comprising a lower casing member having substantially smooth side walls, a plurality of spaced hemispherical members projecting inwardly from the lower casing side walls, and a patient support having outwardly extending, downwardly curved flanges on at least two opposite sides, said flanges resting upon said hemispherical members and being spaced from the adjacent side walls of the lower casing member, whereby liquid may flow downwardly between the flanges and the side walls without passing to the patient support.

References Cited in the file of this patent

UNITED STATES PATENTS

| Number | Name | Date |
|---|---|---|
| 1,176,555 | Hess | Mar. 21, 1916 |
| 2,093,648 | Rice | Sept. 21, 1937 |
| 2,243,999 | Chapple | June 3, 1941 |